United States Patent [19]

Suzuki

[11] Patent Number: 5,491,497
[45] Date of Patent: Feb. 13, 1996

[54] MULTI-WAY INPUT DEVICE

[75] Inventor: Katsutoshi Suzuki, Iwaki, Japan

[73] Assignee: Alps Electric Co., Ltd., Tokyo, Japan

[21] Appl. No.: 321,650

[22] Filed: Oct. 11, 1994

[30] Foreign Application Priority Data

Oct. 18, 1993 [JP] Japan .................................. 5-284089

[51] Int. Cl.⁶ .............................. G09G 5/08; A63F 9/00
[52] U.S. Cl. .......................................... 345/157; 273/438
[58] Field of Search .................................... 345/156, 157,
345/158, 169, 161, 163, 164, 166; 200/61.1,
DIG. 23; 273/438

[56] References Cited

U.S. PATENT DOCUMENTS

| | | | |
|---|---|---|---|
| 4,794,388 | 12/1988 | Matthews | 345/161 |
| 4,910,503 | 3/1990 | Brodsky. | |
| 5,012,230 | 4/1991 | Yasuda. | |
| 5,181,181 | 1/1993 | Glynn | 345/163 |

*Primary Examiner*—Jeffery Brier
*Attorney, Agent, or Firm*—Guy W. Shoup; Patrick T. Bever

[57] ABSTRACT

According to the present invention there is provided an input device capable of making input in three-dimensional directions in conformity with the human's operating sense and easy to operate.

The input device is provided with, in addition to first and second switches disposed on a substrate and a third switch disposed on the substrate in a direction in which it can be pushed in the surface direction of the substrate, a fourth switch capable of being pushed axially of a shaft. An actuator used in the device has a slide-contact surface which is part of a predetermined spherical surface, and in the interior of a housing there is provided a slide-contact surface for sliding contact with the slide-contact surface of the actuator. An operating member used in the device has a shape bridging the upper and lower ends of a stick.

10 Claims, 8 Drawing Sheets

FIG. 1
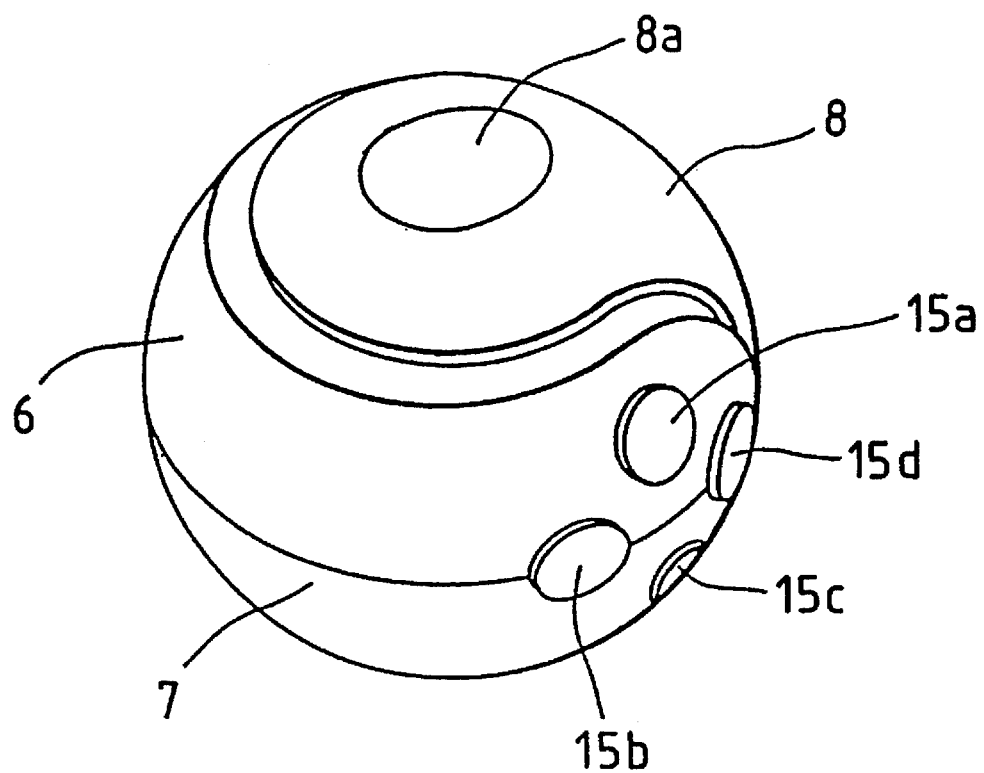
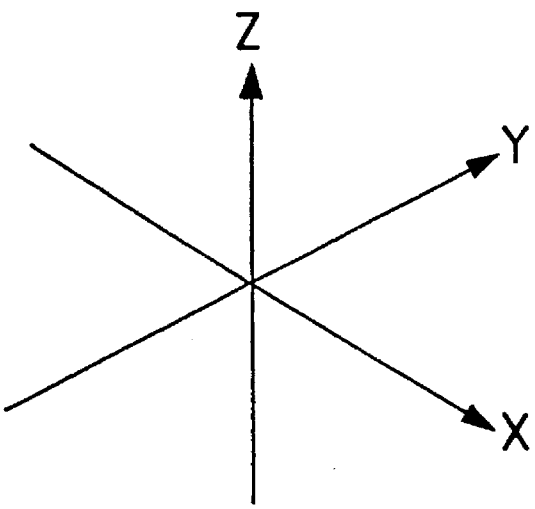

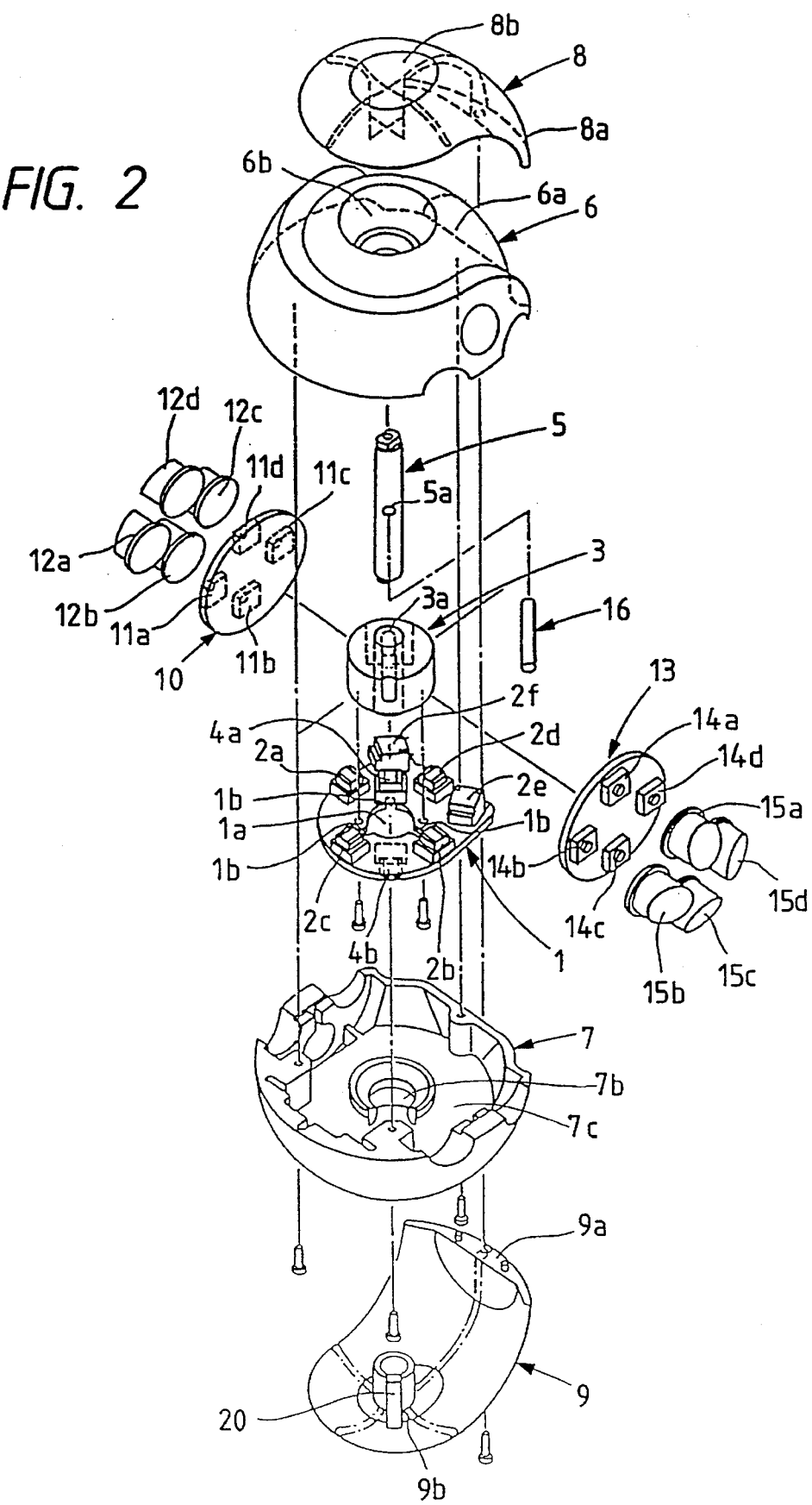

MULTI-WAY INPUT DEVICE

BACKGROUND OF THE INVENTION

1. Field of the Invention

The present invention relates to an input device for three-dimensional input to an information processing device, particularly a multi-way input device for operating the moving direction, etc. of characters in a television game or the like.

2. Description of the Related Art

FIG. 12 is a sectional view of a conventional multi-way input device. On a substrate 31 there are arranged push-button switches 33 in four directions around a support rod 32. On a top portion 32a of the support rod 32 is mounted an operating lever 34 so as to be tiltable in the four directions in which the push-button switches 33 are arranged. The operating lever 34 has four overhang portions 34a overhanging in the four directions of push-button switches 33.

When the operating lever 34 is tilted about the top portion 32a of the support rod 32, its overhang portion 34a positioned in the inclined direction depresses the push-button switch 33 located in the same direction. In this way it is possible to make input in four directions.

According to the above multi-way input device, however, only a planar operation such as cursor movement can be done by operation in two-axis directions, namely in the right and left direction and the direction perpendicular to the paper surface in FIG. 12, and it has been impossible to make input in three-dimensional directions. There has also been the drawback that the operating portion is difficult to grasp because it is stick-like and that therefore it is difficult to perform a quick operation.

SUMMARY OF THE INVENTION

Accordingly, it is the object of the present invention to provide a multi-way input device capable of making input in three-dimensional directions and easy to operate in conformity with the human's operating sense.

In order to achieve the above-mentioned object, in one aspect of the present invention there is provided a multi-way input device including:

an upper housing having a first recess formed in the bottom thereof;

a lower housing having a second recess opposed to the first recess;

an actuator supported rotatably within the first and second recesses and provided with a vertically extending rotatable shaft;

an operating member engaged with the rotatable shaft and adapted to rotate in three-dimensional directions of X, Y and Z axes together with rotation of the actuator;

a first switch for detecting the rotation in the X-axis direction of the operating member;

a second switch for detecting the rotation in the Y-axis direction of the operating member; and a third switch for detecting the rotation in the Z-axis direction of the operating member.

In the second aspect of the present invention there is provided a multi-way input device characterized in that an actuator is provided rotatably within a housing, an operating member which is interlocked with the actuator is provided rotatably in the directions of X, Y and Z axes, a circuit board is in engagement with the actuator, a plurality of switches are mounted on the circuit board, and the rotations in the X, Y and Z directions of the operating member are detected by the operation of the said switches.

On a substrate there are provided, in addition to first and second switches, a third switch disposed in a direction in which it can be pushed in the surface direction of the substrate, and a slide-contact surface of the actuator is part of a predetermined spherical surface, while the housing interior is provided with a slide-contact surface for sliding contact with the slide-contact surface of the actuator. Therefore, it is possible to perform operation in six three-dimensional directions. Besides, since the operating member has a shape bridging the upper and lower ends of the stick, the device is easy to carry with both hands and it is possible to perform operation matching the human's operating sense.

Further, by providing a fourth switch capable of being pushed axially of a shaft, it is made possible to perform a sliding operation along a uniaxial direction, in addition to the tilting operation in three-axis directions.

BRIEF DESCRIPTION OF THE DRAWINGS

FIG. 1 is a perspective view of an input device embodying the present invention;

FIG. 2 is an exploded perspective view thereof;

DETAILED DESCRIPTION OF THE PREFERRED EMBODIMENT

Figure 3A:
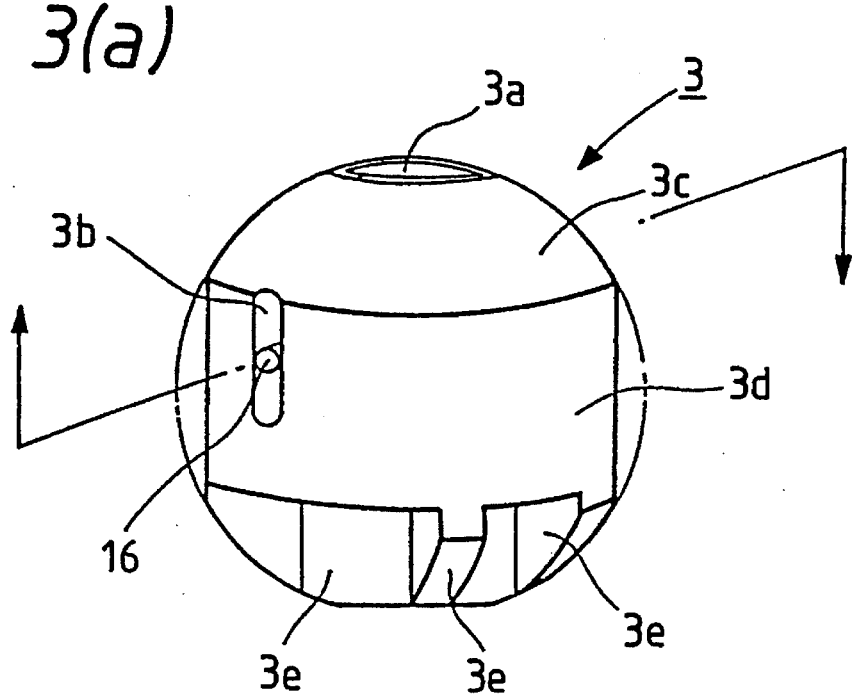
FIG. 3(a) is a perspective view of an actuator and FIG. 3(b) is a sectional view thereof.

In FIGS. 1 and 2, which are a perspective view of a multi-way input device embodying the present invention and an exploded perspective view thereof, respectively, the reference numeral 1 denotes a substrate having a central aperture 1a, with three slots 1b being formed radially from the aperture 1a.

Numerals 2a to 2f denote push-button switches. Of these push-button switches, the four switches 2a, 2b, 2c and 2d are arranged on the substrate 1 in four directions around the aperture 1a so as to be pushed perpendicularly to the substrate. More specifically, the push-button switches 2a and 2b are opposed to each other with the aperture 1a located therebetween, while the push-button switches 2c and 2d are opposed to each other with the aperture 1a therebetween. The push-button switches 2e and 2f are arranged so as to be pushed in parallel with the substrate 1.

Numeral 3 denotes an actuator, which has a central through hole 3a and is mounted on the substrate 1.

Numerals 4a and 4b denote push-button switches, which are arranged in upper and lower positions of the actuator 3 so as to be pushed in directions perpendicular to the substrate 1 and opposite to each other.

Numeral 5 denotes a stick. The stick 5 is inserted through the through hole 3a of the actuator 3 so as to be slidable perpendicularly to the substrate and so that the rotation thereof can be transmitted to the actuator.

Figure 5A:
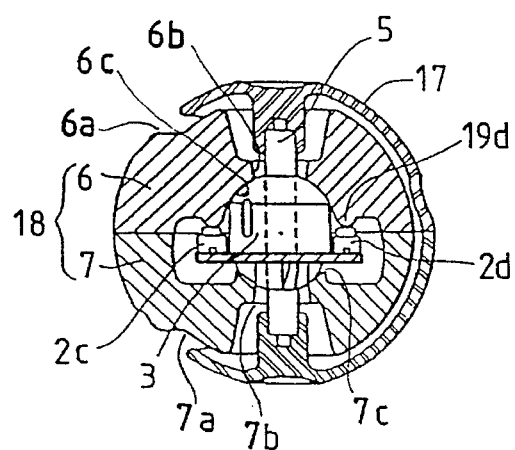
FIG. 5(a) is a sectional view of this embodiment in the state of FIG. 4(a) and FIG. 5(b) is a sectional view of this embodiment in the state of FIG. 4(b)

Numerals 6 and 7 denote an upper housing and a lower housing, respectively. As best shown in FIG. 5(a), the upper housing 6 has a stepped portion 6a and a hole 6b, while the lower housing 7 has a stepped portion 7a and a hole 7b. As shown in FIGS. 2 and 5(a), the lower housing 7 includes a recess 7c formed in a top surface thereof, and FIG. 5(a) shows that the upper housing 6 includes a (second) recess 6c formed in a bottom surface thereof, the first recess 6c and the second recess 7c forming a chamber for rotatably receiving the actuator 3.

Numerals 8 and 9 denote upper and lower components, respectively, of an operating member. Both components are made integral with each other through bonding of respective joint surfaces 8a and 9a. Numerals 8b and 9b denote recesses, which are for making the operating member easier to carry during operation.

Numeral 10 denotes a first side substrate. On the side substrate 10 are arranged four push-button switches 11a to 11d so as to be pushed perpendicularly to the side substrate 10. Disposed on the push-button switches 11a to 11d are stems 12a to 12d, respectively.

Numeral 13 denotes a second side substrate. On the side substrate 13 are arranged four push-button switches 14a to 14d so as to be pushed perpendicularly to the side substrate 13, with stems 15a to 15d being disposed on the push-button switches 14a to 14d, respectively.

Figure 3B:
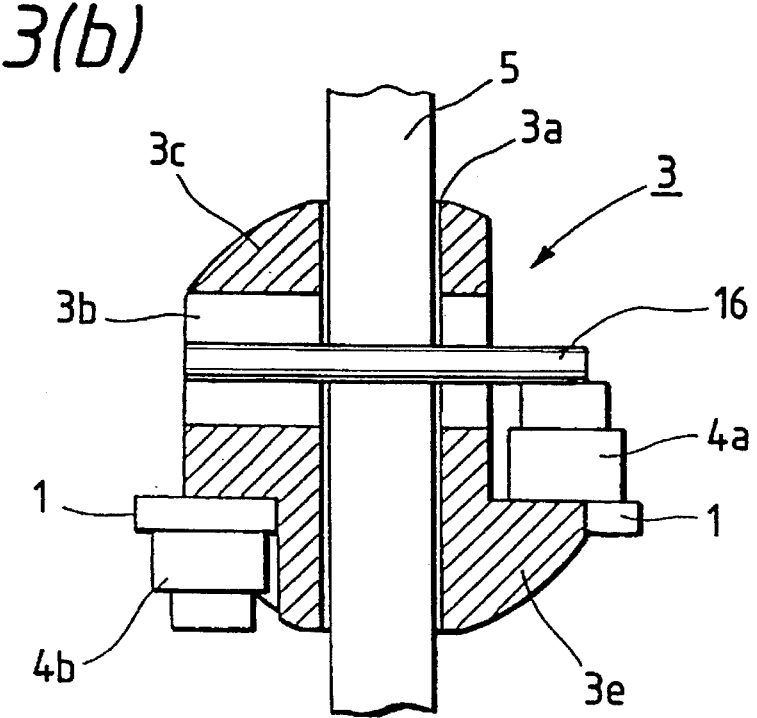

FIG. 3(a) is a perspective view of the actuator 3 shown in FIG. 2, and FIG. 3(b) is a sectional view of the actuator 3 with a slide pin 16 and push-button switches 4a and 4b being attached thereto.

As shown in FIG. 3(a), the actuator 3 has a shape obtained by cutting out from a spherical body. More particularly, the upper surface of the spherical body remains as an upper surface 3c of the actuator 3, while a side face 3d has a cylindrical shape as cut out from the spherical body. Present in lower positions of the actuator 3 are three ribs 3e formed by cutting out partially from the spherical body.

As shown in FIG. 3(b), the ribs 3e of the actuator 3 are fitted in the slots 1b of the substrate 1 so as to project downward from the substrate, thereby fixing the actuator. The stick 5 extends through the through hole 3a, and the slide pin 16 extends through a hole 5a of the stick 5. The slide pin 16 can slide up and down within a slide hole 3b of the actuator 3. The push-button switches 4a and 4b are attached to the actuator in directions opposite to each other.

Figure 4A:
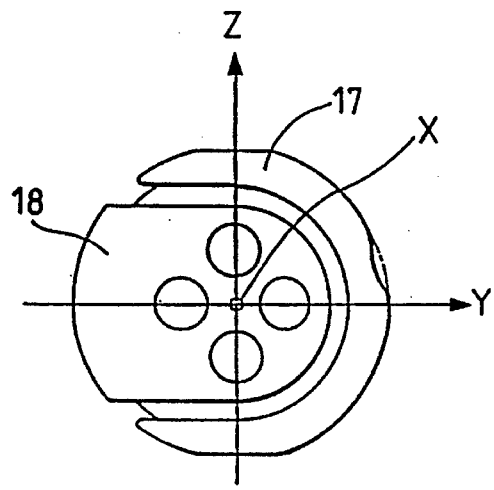
FIG. 4(a) is side view of this embodiment, showing a state before tilting operation
Figure 4B:
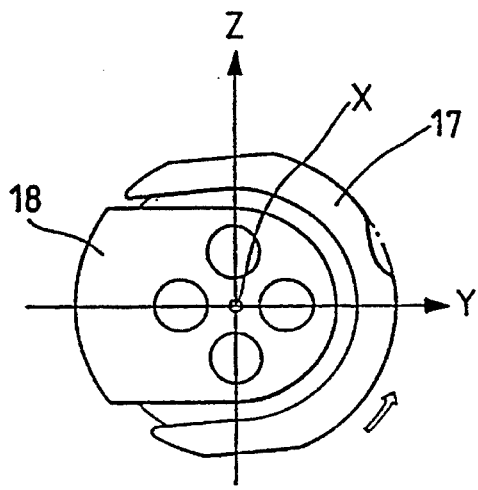
FIG. 4(b) is a side view of this embodiment, showing a motion upon tilting operation around X axis.

FIGS. 4(a) and 4(b) are side views showing a change in state upon tilting operation around X axis in FIG. 1, of which 4(a) shows a state before the operation and 4(b) shows a motion in the operation. In both figures, the direction perpendicular to the paper surface is X-axis direction, the right and left direction is Y-axis direction, and the vertical direction is Z-axis direction. The state shown in FIG. 4(b) is obtained by tilting an integral operating member 17 (composed of upper and lower components 8 and 9) counterclockwise about X axis of an integral housing 18 (composed of upper and lower housings 6 and 7).

Figure 5B:
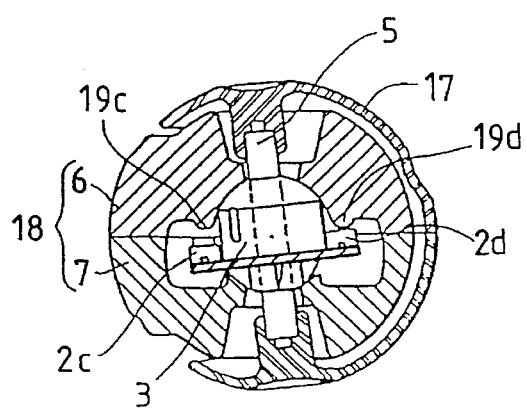

FIGS. 5(a) and 5(b) are sectional views of FIGS. 4(a) and 4(b), respectively. In the interior of the upper housing, as shown in FIG. 5(b), pushing projections 19c and 19d are formed so as to come into abutment with to-be-pushed portions of the push-button switches 2c and 2d, respectively. When the operating member 17 is tilted and the actuator 3 rotates as in FIG. 5(b), the push-button switch 2d is pushed up and is depressed by the pushing projection 19d.

Figure 6A:
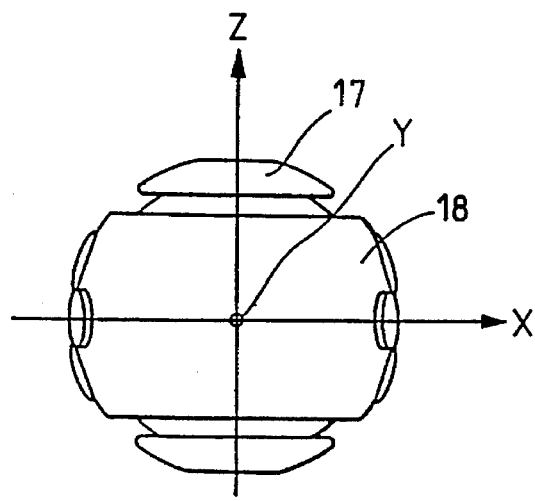
FIG. 6(a) is a rear view of this embodiment, showing a state before tilting operation
Figure 6B:
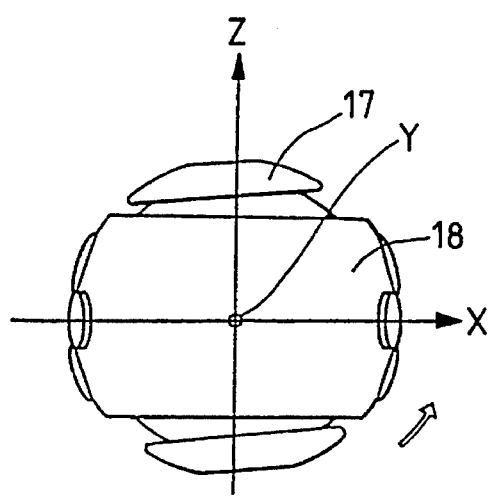
FIG. 6(b) is a rear view of this embodiment, showing a motion upon tilting operation around Y axis.

FIGS. 6(a) and 6(b) are rear views showing a change in state upon tilting operation around Y axis in FIG. 1, of which 6(a) shows a state before the operation and 6(b) shows a motion in the operation. In both figures, the direction perpendicular to the paper surface is Y-axis direction, the right and left direction is X-axis direction, and the vertical direction is Z-axis direction. The state shown in FIG. 6(b) is obtained by tilting the integral operating member 17 counterclockwise about Y axis of the integral housing 18.

Figure 7A:
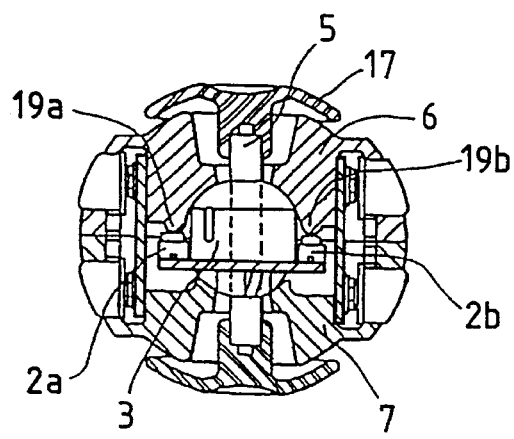
FIG. 7(a) is a sectional view of this embodiment in the state of FIG. 6(a) and FIG. 7(b) is a sectional view of this embodiment in the state of FIG. 6(b)
Figure 7B:
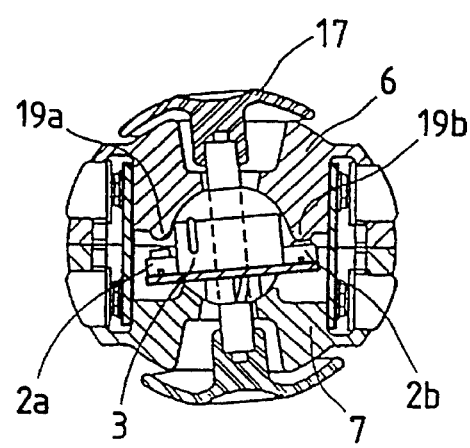

FIGS. 7(a) and 7(b) are sectional views of FIGS. 6(a) and 6(b), respectively. In the interior of the upper housing, as shown in FIG. 7(b), pushing projections 19a and 19b are formed so as to come into abutment with to-be-pushed portions of the push-button switches 2a and 2b, respectively. When the operating member 17 is tilted and the actuator 3 rotates as in FIG. 7(b), the push-button switch 2b is pushed up and is depressed by the pushing projection 19b.

Figure 8A:
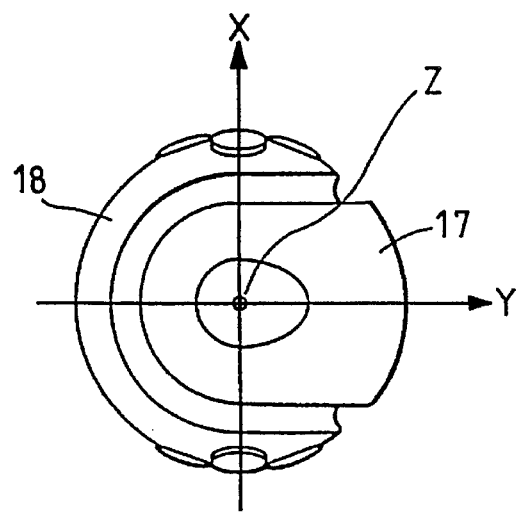
FIG. 8(a) is a top view of this embodiment, showing a state before tilting operation
Figure 8B:
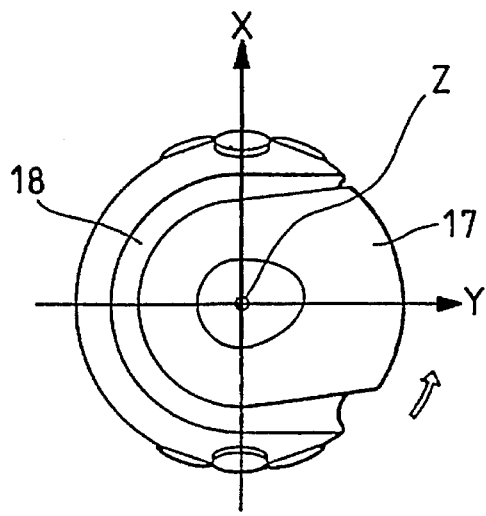
FIG. 8(b) is a top view of this embodiment, showing a motion upon tilting operation around Z axis.

FIGS. 8(a) and 8(b) are top views showing a change in state upon tilting operation around Z axis in FIG. 1, of which 8(a) shows a state before the operation and 8(b) shows a motion in the operation. In both figures, the direction perpendicular to the paper surface is Z-axis direction, the right and left direction is Y-axis direction, and the vertical direction is X-axis direction. The state shown in FIG. 8(b) is obtained by tilting the integral operating member 17 counterclockwise about Z axis of the integral housing 18.

Figure 9A:
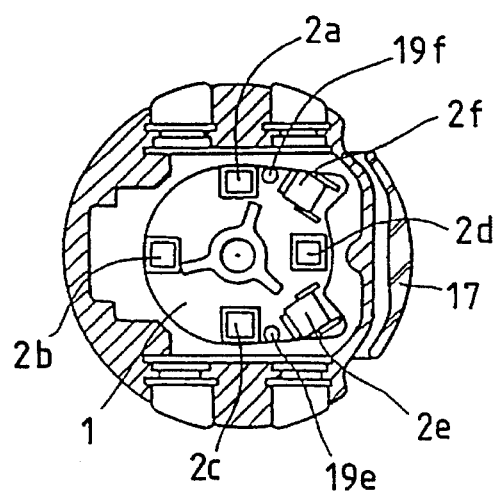
FIG. 9(a) is a sectional view of this embodiment in the state of FIG. 8(a) and FIG. 9(b) is a sectional view of this embodiment in the state of FIG. 8(b)
Figure 9B:
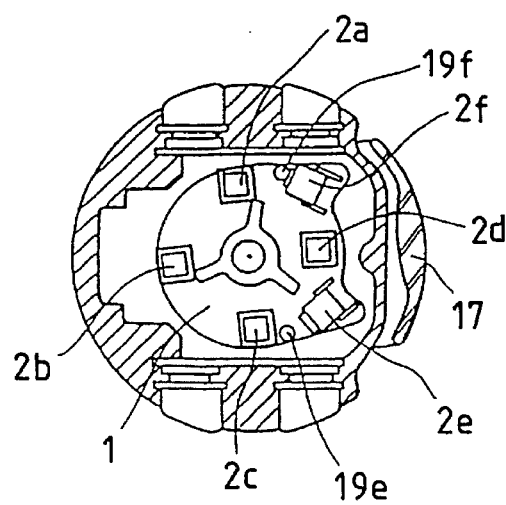

FIGS. 9(a) and 9(b) are sectional views of FIGS. 8(a) and 8(b), respectively. On the substrate 1 are mounted push-button switches 2e and 2f in parallel with the substrate surface, while on the upper housing 6 side there are provided pushing pins 19e and 19f for abutment with to-be-pushed portions of the push-button switches 2e and 2f, respectively. When the operating member 17 is tilted and the actuator 3 rotates as in FIG. 9(b), the push-button switch 2f moves and is pushed by the pushing pin 19f.

Figure 10A:
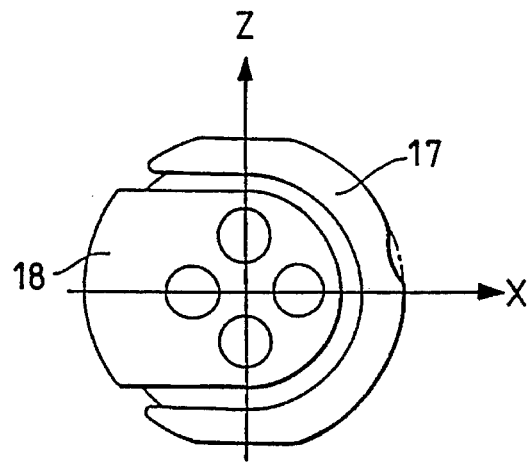
FIG. 10(a) is a side view of this embodiment, showing a state before sliding operation
Figure 10B:
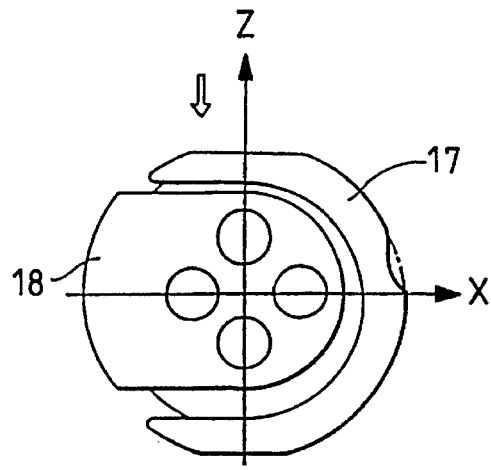
FIG. 10(b) is a side view of this embodiment, showing a motion upon sliding operation.

FIGS. 10(a) and 10(b) are side views showing a change in state upon vertical slide along Z axis in FIG. 1, of which 10(a) shows a state before the sliding operation and 10(b) shows a motion in the same operation. In both figures, the direction perpendicular to the paper surface is Y-axis direction, the right and left direction is X-axis direction, and the vertical direction is Z-axis direction. FIG. 10(b) shows a state wherein the integral operating member 17 has been operated downward along Z axis of the housing 18.

Figure 11A:
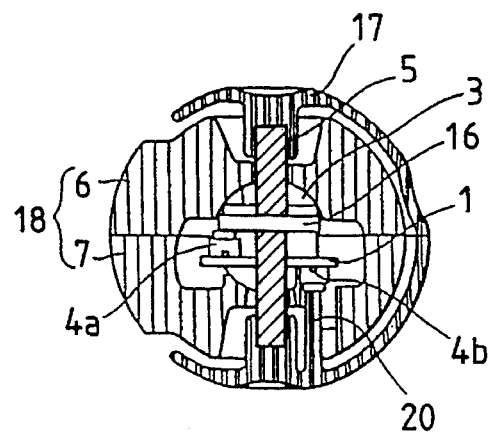
FIG. 11(a) is a sectional view of this embodiment in the state of FIG. 10(a) and FIG. 11(b) is a sectional view of this embodiment in the state of FIG. 10(b)
Figure 11B:
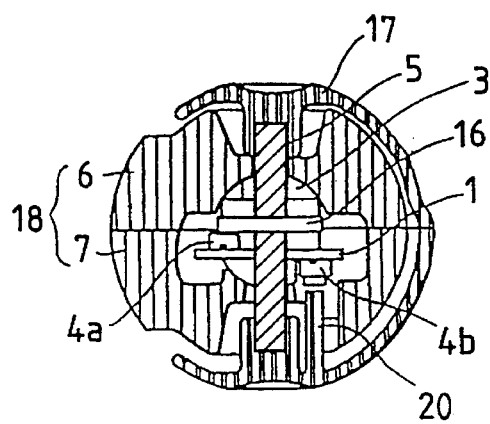
Figure 12:
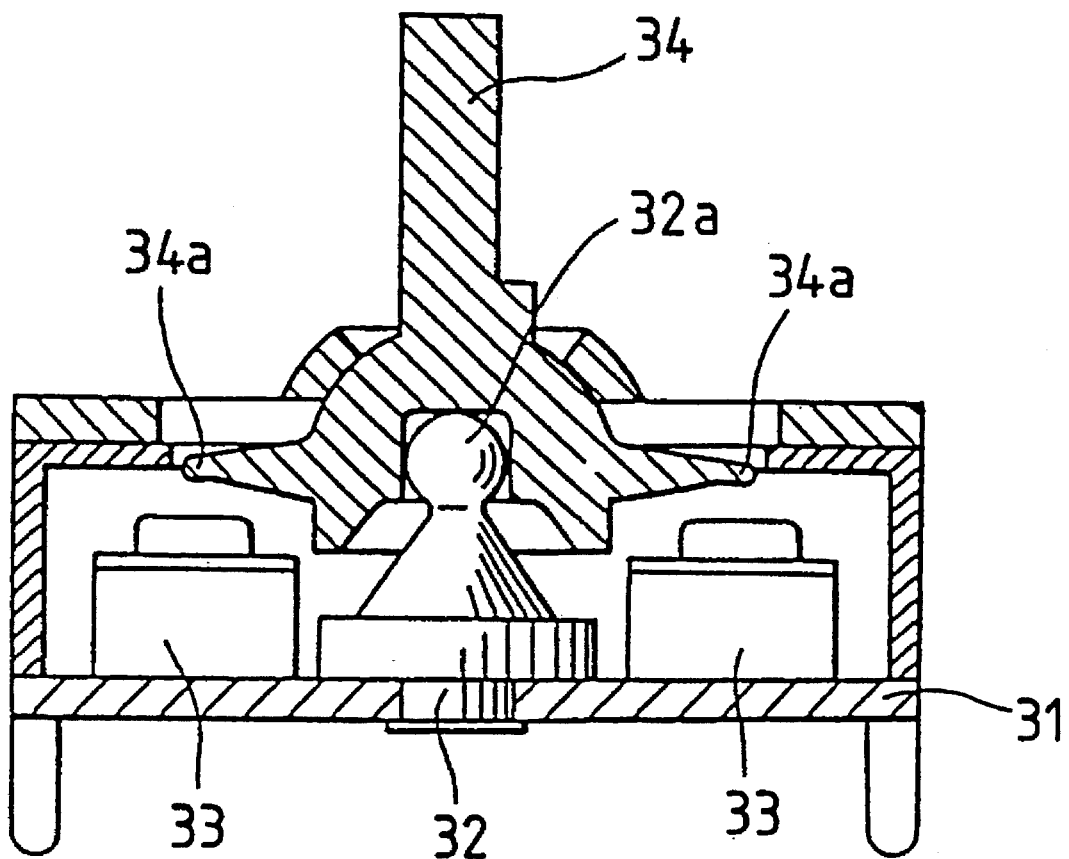
FIG. 12 is a sectional view of a conventional input device.

FIGS. 11(a) and 11(b) are sectional views of FIGS. 10(a) and 10(b), respectively. In FIG. 11(b), the slide pin 16 moves down through the slide hole 3b with downward movement of the stick 5 and depresses the push-button switch 4a.

Conversely, upon upward operation of the operating member 17 relative to the housing 18, a pusher pin 20 is provided in the lower component 9 of the operating member 17 to push the push-button switch 4b.

Although in this embodiment the push-button switches 4a and 4b are provided on the substrate 1 and actuator 3 side, both switches may be provided on the upper and lower housing 6, 7 side and a member corresponding to the pusher pin 20 may be provided in the actuator 3.

Further, although in this embodiment the push-button switches 2a to 2f are all mounted on the substrate 1, they may be fixed directly to the actuator 3 or may be fixed to an integral member of substrate 1 and actuator 3.

According to the present invention, as set forth above, it is possible to provide an input device capable of making input in three-dimensional directions by tilting operations in six directions perpendicular to one another and also capable of making input in a still further direction by sliding operation along a uniaxial direction.

Further, the input device according to the present invention can be operated in conformity with the human's operating sense because it can be operated in three dimensions; besides, it is easy to carry with both hands and is easy to operate.

What is claimed is:

1. A multi-way input device comprising:

an upper housing having a first recess formed in a bottom surface thereof;

a lower housing having a second recess formed in a top surface thereof and opposed to the first recess;

an actuator supported rotatably within said first and second recesses and provided with a vertically extending rotatable shaft;

an operating member engaged with said rotatable shaft and adapted to rotate in three-dimensional directions of X, Y and Z axes together with rotation of said actuator;

a first switch for detecting the rotation in the X-axis direction of said operating member;

a second switch for detecting the rotation in the Y-axis direction of said operating member; and a third switch for detecting the rotation in the Y-axis direction of said operating member.

2. A multi-way input device according to claim 1, further including a fourth switch for detecting the movement of said operating member when the operating member moves vertically with axial movement of said rotatable shaft.

3. A multi-way input device according to claim 1, wherein said upper and lower housings are generally semispherical, and said operating member is generally C-shaped along the surfaces of the upper and lower housings and is engaged at the upper end thereof with said rotatable shaft and is further engaged at the opposite end thereof with the lower end of the rotatable shaft, to afford a generally spherical shape of the device as a whole.

4. A multi-way input device according to claim 1, wherein said first to third switches are mounted on a single substrate, said substrate being engaged with said actuator for rotation together with the actuator.

5. A multi-way input device according to claim 1, wherein a plurality of push-button switches are provided on side faces of said upper and lower housings and are operated with one hand of an operator, while said operating member is rotated with the other hand of the operator to actuate said first to third switches.

6. A multi-way input device comprising:

a housing having an outer surface and defining an inner chamber including a plurality of projections, the housing also defining first and second holes passing through the outer surface to the chamber;

an actuator rotatably mounted within the chamber, the actuator including a shaft having first and second ends respectively extending through the first and second holes formed in the housing;

a first plurality of switches connected to the actuator; and an operating member movably disposed adjacent the outer surface of the housing and fixedly connected to the first and second ends of the shaft;

wherein movement of the operating member relative to the housing causes actuation of at least one of the plurality of switches by at least one of the plurality of projections.

7. The multi-way input device according to claim 6, wherein said plurality of switches includes:

a first switch which is actuated by a first projection in response to rotation around an X axis of the operating member relative to the housing;

a second switch which is actuated by a second projection in response to a rotation around a Y axis of the operating member relative to the housing; and a third switch which is actuated by a third projection in response to a rotation around a Z axis of the operating member relative to the housing.

8. A multi-way input device according to claim 7, further comprising a fourth switch, connected to the actuator and actuated by a fourth projection, for detecting movement of said operating member along an axis of the shaft.

9. A multi-way input device according to claim 8, wherein the first, second, third and fourth switches are mounted on a circuit board, the circuit board being fixedly connected to the actuator.

10. A multi-way input device according to claim 6, wherein the housing is generally spherical, and the operating member is generally C-shaped having an upper end connected to the first end of the shaft, and lower end connected to the second end of the shaft.

* * * * *